United States Patent
Hiraoka (10) Patent No.: US 9,551,287 B2
(45) Date of Patent: Jan. 24, 2017

(54) INTERNAL COMBUSTION ENGINE CONTROL APPARATUS AND CONTROL METHOD THEREOF

(71) Applicant: Mitsubishi Heavy Industries, Ltd., Tokyo (JP)

(72) Inventor: Kenji Hiraoka, Tokyo (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 60 days.

(21) Appl. No.: 14/416,620

(22) PCT Filed: Oct. 30, 2012

(86) PCT No.: PCT/JP2012/077992
§ 371 (c)(1),
(2) Date: Jan. 22, 2015

(87) PCT Pub. No.: WO2014/068657
PCT Pub. Date: May 8, 2014

(65) Prior Publication Data
US 2015/0226142 A1    Aug. 13, 2015

(51) Int. Cl.
*B60T 7/12*    (2006.01)
*F02D 41/00*    (2006.01)
(Continued)

(52) U.S. Cl.
CPC ......... *F02D 41/0052* (2013.01); *F02D 41/144* (2013.01); *F02D 41/1454* (2013.01);
(Continued)

(58) Field of Classification Search
CPC .... F02B 19/1052; F02D 19/081; F02D 35/023
(Continued)

(56) References Cited

U.S. PATENT DOCUMENTS

2002/0173898 A1* 11/2002 Itoyama ............... F02B 37/24
701/104
2004/0055282 A1 3/2004 Gray et al.
(Continued)

FOREIGN PATENT DOCUMENTS

EP    2405120 A1    11/2012
JP    10-141125 A    5/1998
(Continued)

OTHER PUBLICATIONS

Decision to Grant, Issued Apr. 5, 2016, for corresponding JP App. No. 2014-544087, which is a National Phase of PCT/JP2012/077992, "The Decision to Grant has been received," 3 Pages.
(Continued)

*Primary Examiner* — John Kwon
(74) *Attorney, Agent, or Firm* — Berkeley Law & Technology Group, LLP (57) ABSTRACT

It is an object of the present invention to improve estimation accuracy of an air excess ratio within a fuel spray and quickly cause the air excess ratio to approximate to a target value when the engine load factor rises. An internal combustion engine control apparatus includes a parameter acquiring section to acquire an air intake parameter and a fuel parameter, a first estimation section to estimate an in-fuel-spray air excess ratio using the air intake parameter and fuel parameter, and a pressure calculation section to calculate, if the in-fuel-spray air excess ratio is less than a target in-fuel-spray air excess ratio, a necessary fuel injection pressure to match the in-fuel-spray air excess ratio with the target in-fuel-spray air excess ratio, in which if the necessary fuel injection pressure is equal to or less than a maximum injection pressure, fuel injection is to be performed at the necessary fuel injection pressure.

3 Claims, 4 Drawing Sheets

(51) Int. Cl.
   *F02D 41/14* (2006.01)
   *F02D 41/38* (2006.01)
   *G01M 15/10* (2006.01)

(52) U.S. Cl.
   CPC ......... *F02D 41/1458* (2013.01); *F02D 41/38* (2013.01); *F02D 41/3836* (2013.01); *G01M 15/106* (2013.01); *F02D 2200/0602* (2013.01); *F02D 2250/21* (2013.01); *F02D 2250/31* (2013.01); *F02D 2250/32* (2013.01); *F02D 2250/38* (2013.01); *F02M 26/23* (2016.02); *Y02T 10/47* (2013.01)

(58) Field of Classification Search
   USPC ......... 701/103–105, 108, 114, 115; 123/434, 123/435, 676, 568
   See application file for complete search history.

(56) References Cited

U.S. PATENT DOCUMENTS

| | | | | |
|---|---|---|---|---|
| 2004/0219079 | A1* | 11/2004 | Hagen | F01K 21/047 422/607 |
| 2004/0261414 | A1* | 12/2004 | Araki | F02D 19/0628 60/602 |
| 2005/0022503 | A1* | 2/2005 | Miura | F02D 41/0002 60/274 |
| 2007/0255484 | A1* | 11/2007 | Imai | F02D 41/0007 701/102 |
| 2008/0172169 | A1* | 7/2008 | Kuronita | F02D 41/1448 701/103 |
| 2009/0055076 | A1 | 2/2009 | Onishi et al. | |
| 2015/0034061 | A1* | 2/2015 | Masubuchi | F02D 19/0615 123/704 |

FOREIGN PATENT DOCUMENTS

| | | |
|---|---|---|
| JP | 2003-21000 A | 1/2003 |
| JP | 2005-226460 A | 8/2005 |
| JP | WO 2006/106893 | 10/2006 |
| JP | 2008-38709 A | 2/2008 |
| JP | 2011-32973 A | 2/2011 |
| WO | WO 2014/068657 A1 | 8/2014 |

OTHER PUBLICATIONS

Extended European Search Report, App. No. 12887331.2 which is a National Phase of App. No. PCT/JP2012/077992, Mailed Jun. 20, 2016, 8 Pages.

International Search Report, Application No. PCT/JP2012/077992, Filed Oct. 30, 2012, Mailed Dec. 11, 2012, 4 Pages.

Written Opinion of the International Searching Authority, Application No. PCT/JP2012/077992, Filed Oct. 30, 2012, Mailed Nov. 12, 2012, 8 Pages.

Notification Concerning the Filing of Amendments of the Claims, Application No. PCT/JP2012/077992, Filed Oct. 30, 2012, Mailed Aug. 13, 2013, 1 Page.

* cited by examiner

INTERNAL COMBUSTION ENGINE CONTROL APPARATUS AND CONTROL METHOD THEREOF

FIELD

The present invention relates to an internal combustion engine control apparatus and a control method thereof.

BACKGROUND

It is generally known that an exhaust gas of an internal combustion engine such as a diesel engine contains harmful substances such as NOx, SOx and smoke and dust or substances that apply load to the environment. Thus, various schemes have been proposed for reducing such substances.

Conventionally, a method for controlling an air excess ratio to an appropriate value is known as one method for reducing smoke, dust and/or the like.

For example, PTL 1 (below) discloses a method for estimating a flowing state of an in-cylinder gas of an internal combustion engine, taking into account the estimated flowing state of the in-cylinder gas to estimate a value equivalent to a concentration of an air-fuel mixture of fuel and intake air as an air-fuel mixture concentration equivalent value, and adjusting engine control parameters (e.g., fuel injection timing, fuel injection pressure, amount of fuel injection, amount of exhaust gas recirculation) so that the estimated air-fuel mixture concentration equivalent value matches a predetermined concentration.

PTL 1: Japanese Unexamined Patent Application, Publication No. 2005-226460

SUMMARY

However, since an oxygen molar concentration of the intake air is not taken into consideration in the method disclosed in above PTL 1, when an EGR is introduced, that is, when the oxygen molar concentration changes, the estimation accuracy of the air excess ratio unfortunately decreases.

In the case of the internal combustion engine, when an engine load factor rises suddenly, the response of a supercharger delays, and so the amount of air in the combustion chamber decreases with respect to the same fuel injection amount compared to that in steady operation. This causes the air excess ratio to deteriorate, making it more likely to produce smoke, dust and/or the like.

For this reason, when the engine load factor rises suddenly, it is necessary to quickly increase the air excess ratio so as to reach a target value. Generally, there can be a method for reducing the amount of fuel injection and increasing the air excess ratio, but such a method causes the amount of torque generated to reduce, causing the output response of the engine to deteriorate, and is therefore not desirable. On the other hand, an engine using an exhaust gas recirculation (EGR) scheme may increase the air excess ratio to a target value by closing an EGR valve. In this case, however, there is inconvenience that an intake oxygen molar concentration rises and the amount of NOx generated increases.

The present invention has been made in view of the above-described circumstances and it is an object of the present invention to provide an internal combustion engine control apparatus and a control method thereof capable of improving estimation accuracy of an air excess ratio within a fuel spray (hereinafter referred to as "in-fuel-spray air excess ratio") and quickly causing the in-fuel-spray air excess ratio to approximate to a target value when the engine load factor rises.

A first aspect of the present invention is an internal combustion engine control apparatus including a parameter acquiring section configured to acquire an air intake parameter relating to intake air including an intake oxygen molar concentration and a fuel parameter relating to fuel injection, a first estimating section configured to estimate an in-fuel-spray air excess ratio using the air intake parameter and the fuel parameter, a first determining section configured to determine whether or not the in-fuel-spray air excess ratio is equal to or higher than a preset predetermined target in-fuel-spray air excess ratio, a pressure calculating section configured to calculate, when the in-fuel-spray air excess ratio is determined to be less than the target in-fuel-spray air excess ratio, a necessary fuel injection pressure to match the in-fuel-spray air excess ratio with the target in-fuel-spray air excess ratio, and a second determining section configured to determine whether or not the necessary fuel injection pressure is equal to or less than a preset maximum injection pressure, in which when the necessary fuel injection pressure is determined to be equal to or less than the maximum injection pressure, fuel injection is performed at the necessary fuel injection pressure.

A second aspect of the present invention is the internal combustion engine control apparatus applied to an internal combustion engine adopting an exhaust gas recirculation scheme in which part of an exhaust gas of the engine is circulated into an air intake system, the apparatus further including a second estimating section configured to estimate, when the second determining section determines that the maximum injection pressure is exceeded, an in-fuel-spray air excess ratio when the maximum injection pressure is set as the fuel injection pressure, and an oxygen molar concentration calculating section configured to calculate a necessary intake oxygen molar concentration to match the in-fuel-spray air excess ratio estimated by the second estimating section with the target in-fuel-spray air excess ratio, in which when the necessary fuel injection pressure is determined to exceed the maximum injection pressure, fuel injection is performed at the maximum injection pressure and the amount of exhaust gas to be circulated into the air intake system is controlled based on the necessary intake oxygen molar concentration.

In the internal combustion engine control apparatus, when the necessary intake oxygen molar concentration exceeds an upper limit value of concentration set in advance based on an atmospheric oxygen molar concentration, the amount of exhaust gas to be circulated into the air intake system may be set to 0.

A third aspect of the present invention is an internal combustion engine control method including acquiring an air intake parameter relating to intake air including an intake oxygen molar concentration and a fuel parameter relating to fuel injection, estimating an in-fuel-spray air excess ratio using the air intake parameter and the fuel parameter, determining whether or not the in-fuel-spray air excess ratio is equal to or higher than a preset predetermined target in-fuel-spray air excess ratio, calculating, when the in-fuel-spray air excess ratio is determined to be less than the target in-fuel-spray air excess ratio, a necessary fuel injection pressure to match the in-fuel-spray air excess ratio with the target in-fuel-spray air excess ratio, and determining whether or not the necessary fuel injection pressure is equal to or less than a preset maximum injection pressure, in which when the necessary fuel injection pressure is determined to be equal to or less than the maximum injection pressure, fuel injection is performed at the necessary fuel injection pressure.

The present invention provides an effect of improving estimation accuracy of the in-fuel-spray air excess ratio and being able to quickly cause the in-fuel-spray air excess ratio to approximate to a target value when the engine load factor rises.

DETAILED DESCRIPTION

Hereinafter, an internal combustion engine control apparatus and a control method thereof according to an embodiment of the present invention will be described with reference to the accompanying drawings.

Figure 1:
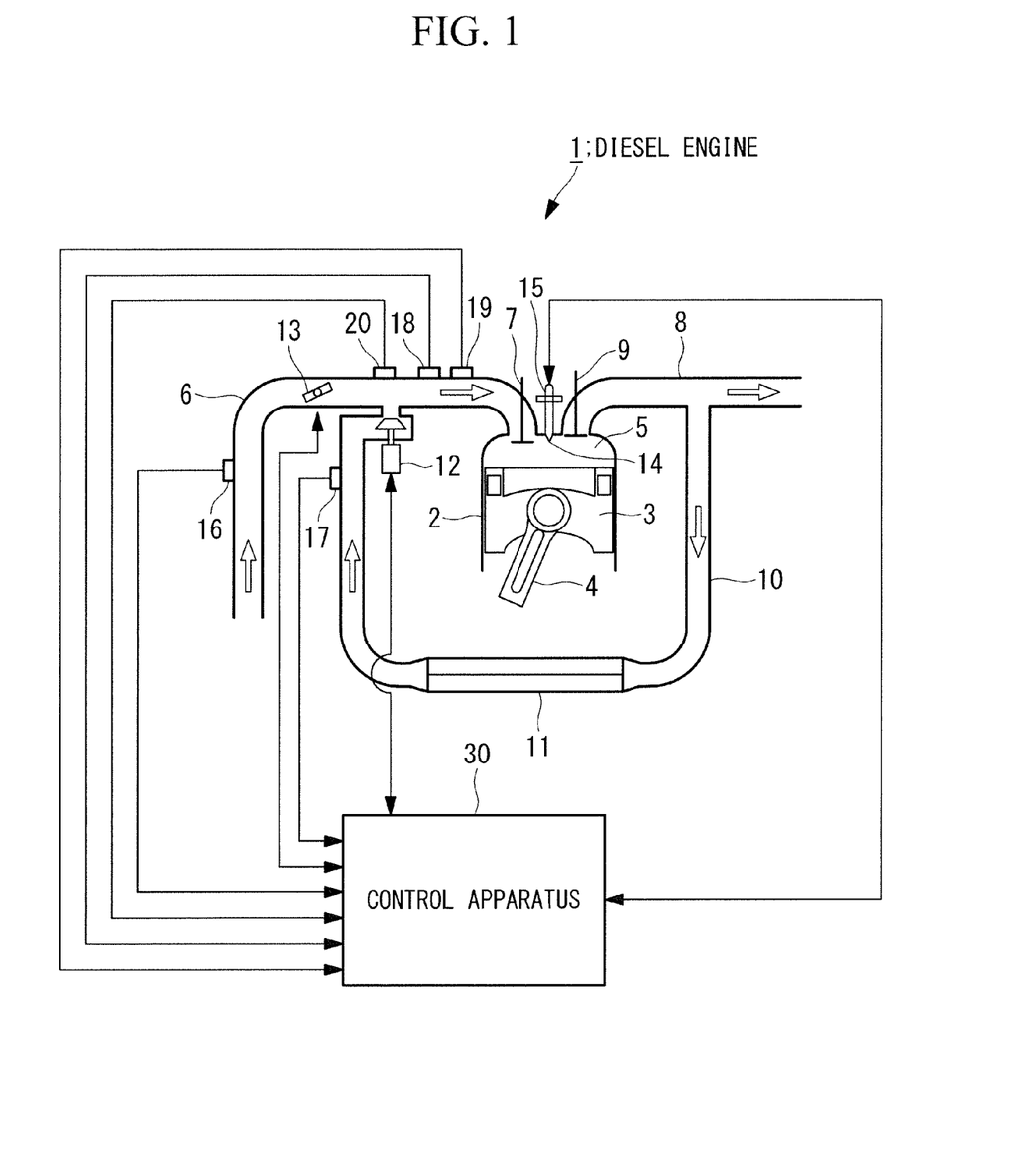
FIG. 1 is a diagram illustrating a schematic configuration of an internal combustion engine when a diesel engine is adopted as an example of an internal combustion engine of the present invention.

FIG. 1 is a diagram illustrating a schematic configuration of an internal combustion engine when a diesel engine is adopted as an example of an internal combustion engine. As shown in FIG. 1, a diesel engine (hereinafter referred to as "engine") 1 is provided with a piston 3 fitted in a cylinder 2 so as to slidably reciprocate and a crank shaft (not shown) that converts the reciprocating motion of the piston 3 to rotation via a connecting rod 4.

In the engine 1, a combustion chamber 5 is formed as a compartment between a top surface of the piston 3 and an inner surface of the cylinder 2. An intake passage 6 is connected to the combustion chamber 5 and an air intake valve 7 for opening/closing an air intake port is provided therein. In addition, an exhaust passage 8 is connected to the combustion chamber 5 and an exhaust valve 9 for opening/closing an exhaust port is provided therein.

An EGR (exhaust gas recirculation) passage 10 is connected at some midpoint of the exhaust passage 8 for recirculating part of the exhaust gas that circulates along the exhaust passage 8 back to the intake passage 6. The EGR passage 10 is provided with an EGR cooler 11 that cools the EGR gas and an EGR valve 12 that controls an EGR gas flow rate. An air intake throttle valve 13 is provided upstream in the air flow of the connection part of the EGR passage 10 in the intake passage 6.

A Fuel injection nozzle 14 that injects a fuel which is highly pressurized by a fuel injection pump (not shown) into the combustion chamber 5 is provided in the combustion chamber 5. Here, for the above fuel injection pump, a common rail scheme may be adopted which can change a fuel injection pressure according to an engine operating condition through electronic control. The amount of fuel injection and injection timing by the Fuel injection nozzle 14 are controlled by a control apparatus 30, which will be described later, controlling a Fuel injector 15 provided upstream of the Fuel injection nozzle 14 in the fuel flow.

An air flow meter 16 for detecting an amount of air intake into the combustion chamber 5 through the intake passage 6 is provided upstream of the air intake throttle valve 13 of the intake passage 6 in the air flow.

An intake manifold at a distal end portion on the combustion chamber 5 side of the intake passage 6 is provided with an intake manifold pressure sensor 18, an intake manifold temperature sensor 19, and an intake manifold oxygen molar concentration sensor 20 for respectively detecting a pressure, temperature, oxygen molar concentration in the intake manifold.

Measured values of the air flow meter 16, intake manifold pressure sensor 18, intake manifold temperature sensor 19, and intake manifold oxygen molar concentration sensor 20 are inputted to the control apparatus 30.

Figure 2:
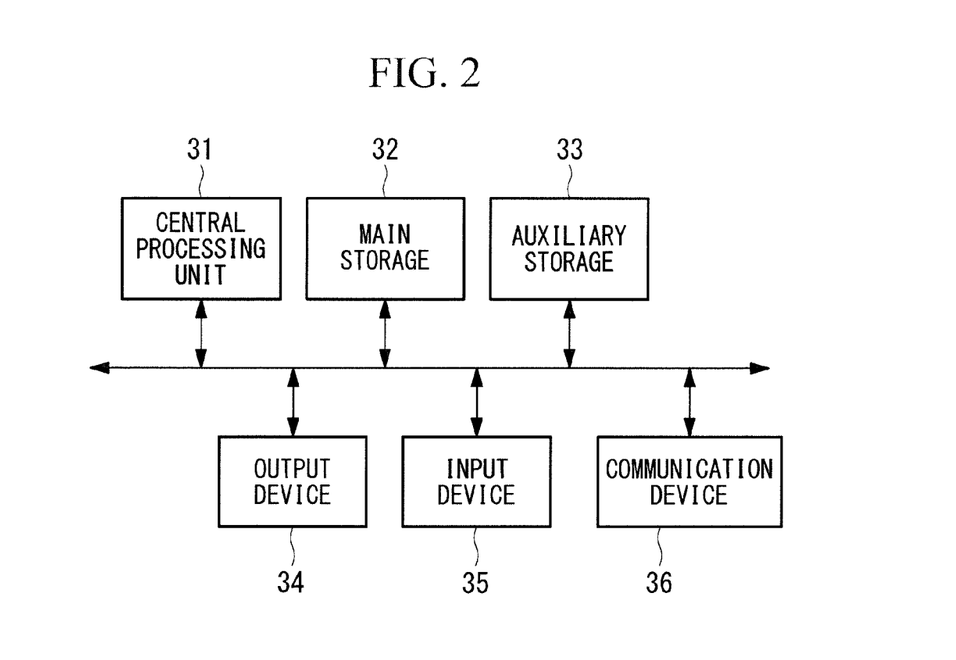
FIG. 2 is a diagram illustrating an example of a hardware configuration of the internal combustion engine control apparatus according to an embodiment of the present invention.

The control apparatus 30 is, for example, a microcomputer and is provided with a central processing unit 31, a main storage 32 such as RAM (Random Access Memory), an auxiliary storage 33, an output device 34, an input device 35, and a communication device 36 that exchanges communications with an external device or the like as shown in FIG. 2.

The auxiliary storage 33 is a computer-readable recording medium and is, for example, a magnetic disk, magneto-optical disk, CD-ROM, DVD-ROM or semiconductor memory. The auxiliary storage 33 stores various programs (e.g., in-fuel-spray air excess ratio control program), and the central processing unit 31 reads a program from the auxiliary storage 33 into the main storage 32 and executes the program to thereby implement various kinds of processing.

Figure 3:
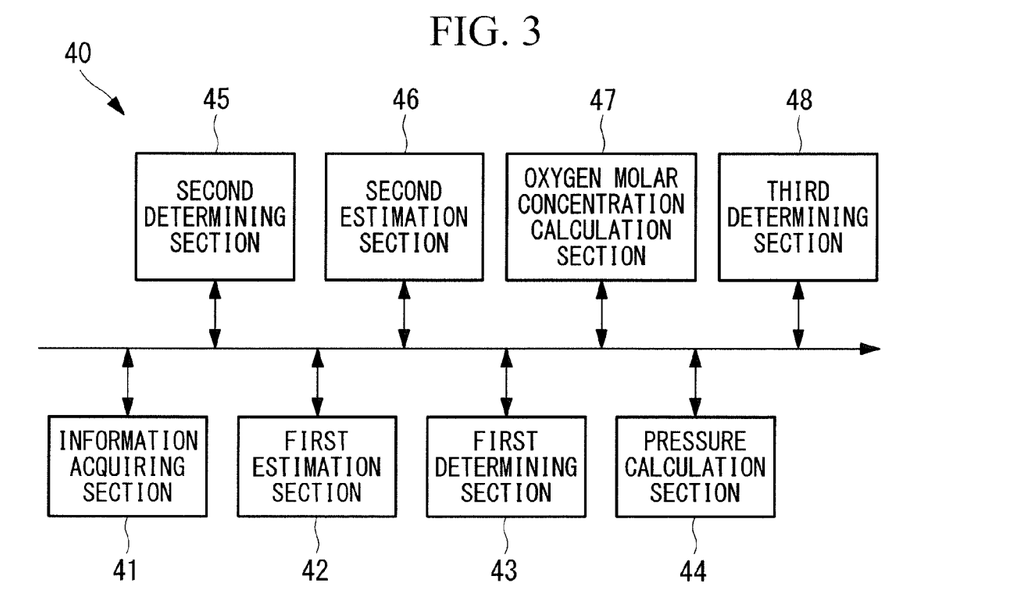
FIG. 3 is a diagram illustrating functional blocks relating to an in-fuel-spray air excess ratio control function among various functions provided for the internal combustion engine control apparatus according to the embodiment of the present invention.

For example, the control apparatus 30 is provided with an in-fuel-spray air excess ratio control function that controls the in-fuel-spray air excess ratio in the combustion chamber 5. FIG. 3 is a diagram illustrating function blocks relating to the in-fuel-spray air excess ratio control function among various functions provided for the control apparatus 30.

As shown in FIG. 3, as an in-fuel-spray air excess ratio control section 40, the control apparatus 30 is provided with a parameter acquiring section 41, a first estimation section 42, a first determining section 43, a pressure calculation section 44, a second determining section 45, a second estimation section 46, an oxygen molar concentration calculation section 47, and a third determining section 48.

The parameter acquiring section 41 acquires various parameters necessary to calculate an in-fuel-spray air excess ratio. More specifically, the parameter acquiring section 41 acquires air intake parameters relating to intake air including an intake oxygen molar concentration and fuel parameters relating to fuel injection. Examples of the air intake parameters include intake oxygen molar concentration, air intake pressure and air intake temperature measured by the intake manifold oxygen molar concentration sensor 20, intake manifold pressure sensor 18, and intake manifold temperature sensor 19. Examples of the fuel parameters include fuel injection pressure and fuel ignition delay. These parameters are acquired based on, for example, a command value used for the control apparatus 30 to control the fuel injection apparatus.

The first estimation section 42 calculates the in-fuel-spray air excess ratio using the air intake parameters and fuel parameters acquired by the parameter acquiring section 41 and a preset predetermined value set in advance.

For example, the first estimation section 42 has in-fuel-spray air excess ratio estimation arithmetic expressions for estimating an in-fuel-spray air excess ratio based on a fuel spray travel of the fuel in advance as shown below and calculates the in-fuel-spray air excess ratio by using the above various parameters for these arithmetic expressions.

Figure 4:
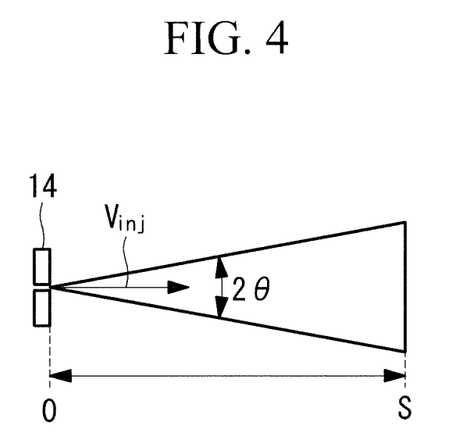
FIG. 4 is a diagram provided for describing an example of an in-fuel-spray air excess ratio calculation method.

The arithmetic expressions shown below correspond to a technique of calculating the air excess ratio within the fuel spray by calculating a fuel spray travel S at the time of fuel ignition $t_{ign}$ and assuming that the fuel spray is formed in a conical shape as shown in FIG. 4. Note that the technique of calculating the in-fuel-spray air excess ratio is not limited to this method. However, the intake oxygen molar concentration needs to be included as a parameter.

Hereinafter, the technique of calculating the in-fuel-spray air excess ratio by the first estimation section 42 will be described.

The first estimation section 42 calculates a cylinder pressure at a top dead center $P_{comp}\{Pa\}$, difference between a fuel injection pressure and a cylinder pressure $\Delta P\{Pa\}$, cylinder temperature at the top dead center $T_{comp}\{K\}$, fuel injection speed $V_{inj}\{m/s\}$, cylinder air density at the top dead center $\rho_a\{kg/m^3\}$, nozzle cross-sectional area per orifice $A_{noz}\{m^2\}$, fuel spray travel $S\{m\}$ and fuel spray volume $Vol_{sp}\{m^3\}$, using an air intake pressure $P_{inmam}\{Pa\}$, fuel injection pressure $P_{inj}\{Pa\}$, air intake temperature $T_{inmani}\{K\}$, intake oxygen molar concentration $O_{2\_intake}\{\%\}$ and fuel injection period t acquired by the parameter acquiring section 41, and preset compression ratio $\epsilon$, nozzle orifice diameter $d_{noz}$, fuel density $\rho_f\{kg/m^3\}$, specific heat ratio $\kappa$, nozzle flow coefficient c, and gas constant $R\{J/(K\cdot mol)\}$ according to following expressions (1) to (11).

Regarding following expressions (7) and (8), the fuel spray travel $S\{m\}$ is calculated using expression (7) when the fuel injection period t is equal to or less than $t_b$ defined in expression (9) and the fuel spray travel $S\{m\}$ is calculated using expression (8) when the fuel injection period t is higher than $t_b$.

$$P_{comp} = P_{inmani} \cdot \varepsilon^\kappa \quad (1)$$

$$T_{comp} = T_{inmani} \cdot \varepsilon^{(\kappa-1)} \quad (2)$$

$$\Delta P = P_{inj} - P_{comp} \quad (3)$$

$$V_{inj} = \sqrt{\frac{2\Delta P}{\rho_f}} \quad (4)$$

$$\rho_a = \frac{0.02883 \cdot P_{comp}}{R \cdot T_{comp}} \quad (5)$$

$$A_{noz} = \pi \left(\frac{d_{noz}}{2}\right)^2 \quad (6)$$

$$S = 0.39 \left(\frac{2\Delta P}{\rho_f}\right)^{0.5} \cdot t \quad (0 < t \le t_b) \quad (7)$$

$$S = 2.95 \left(\frac{\Delta P}{\rho_a}\right)^{0.25} (t \cdot d_{noz})^{0.5} \quad (t_b < t) \quad (8)$$

$$t_b = 28.65 \frac{\rho_f \cdot d_{noz}}{(\rho_a \cdot \Delta P)^{0.5}} \quad (9)$$

$$\tan 2\theta = 0.427 \left(\frac{\rho_a}{\rho_f}\right)^{0.35} \quad (10)$$

$$Vol_{sp} = \pi \cdot (S \cdot \tan\theta)^2 \cdot S \cdot \left(\frac{1}{3}\right) \quad (11)$$

The first estimation section 42 calculates a theoretical air-fuel ratio L from an intake oxygen molar concentration $O_{2\_intake}\{\%\}$. For example, when the oxygen molar concentration in the air is 20.9%, the theoretical air-fuel ratio $L_0$ is expressed by following expression (12) based on expression (A.24) of Annex A of JIS B8008-1:2009. The unit is an amount of air {kg} necessary per kg of the fuel.

$$L_0 = \left(\frac{\phi_{C,mass} \times 100}{12.011} + \frac{\phi_{H,mass} \times 100}{4.03176} + \frac{\phi_{S,mass} \times 100}{32.06}\right) \times 1.382 [kg/kg] \quad (12)$$
$$= 11.506 \phi_{C,mass} + 34.278 \phi_{H,mass} + 4.311 \phi_{S,mass} [kg/kg]$$

In above expression (12), $\phi_{C,mass}$ represents a carbon mass ratio {-} in the fuel, $\phi_{H,mass}$ represents a hydrogen mass ratio {-} in the fuel, and $\phi_{S,mass}$ represents a sulfur mass ratio {-} in the fuel. Here, for example, if $\phi_{S,mass}=0.87\{-\}$, $\phi_{H,mass}=0.13\{-\}$ and $\phi_{S,mass}=0.00\{-\}$ are used as typical values of a diesel fuel (in the case of light oil), $L_0=14.47$ is obtained. Note that this value applies to a case where an oxygen molar concentration in the air is 20.9%.

When the oxygen molar concentration in the air changes, since the amount {kg} of air necessary per kg of the fuel changes according to the oxygen molar concentration, the theoretical air-fuel ratio when the EGR is introduced is given by following expression (13) using an intake oxygen molar concentration $O_{2\_intake}\{\%\}$.

$$L = 14.47 \times \frac{20.9}{O_{2\_intake}[\%]} \quad (13)$$

Next, various parameters are calculated using the above arithmetic expressions, and an in-fuel-spray air excess ratio $\lambda_{SP}$ is calculated using following expression (14) using these calculation results and the theoretical air-fuel ratio L acquired from the intake oxygen molar concentration $O_{2\_intake}\{\%\}$.

$$\lambda_{sp} = \frac{Vol_{sp} \cdot \rho_a}{A_{noz} \cdot V_{inj} \cdot \rho_f \cdot t} \cdot \frac{1}{L} \quad (14)$$

The first determining section 43 determines whether or not the in-fuel-spray air excess ratio $\lambda_{SP}$ calculated by the first estimation section 42 is equal to or higher than a preset predetermined target in-fuel-spray air excess ratio $\lambda_{SP}^*$. Here, the target in-fuel-spray air excess ratio is a value determined according to an air excess ratio during steady operation.

When the first determining section 43 determines that the in-fuel-spray air excess ratio $\lambda_{SP}$ is less than the target in-fuel-spray air excess ratio $\lambda_{SP}^*$, the pressure calculation section 44 calculates a necessary fuel injection pressure $P_{inj\_new}$, to match the in-fuel-spray air excess ratio $\lambda_{SP}$ with the target in-fuel-spray air excess ratio $\lambda_{SP}^*$.

The second determining section 45 determines whether or not the necessary fuel injection pressure $P_{inj\_new}$ is equal to or less than a preset maximum injection pressure.

Here, the maximum injection pressure is set to a maximum injection pressure determined, for example, by a mechanical structure of the fuel injection apparatus.

When the second determining section 45 determines that the necessary fuel injection pressure exceeds the maximum injection pressure, the second estimation section 46 estimates the in-fuel-spray air excess ratio $\lambda_{SP\_pmax}$ when the maximum injection pressure is set as a fuel injection pressure. More specifically, the in-fuel-spray air excess ratio when the maximum injection pressure is set as the fuel injection pressure $P_{inj}\{Pa\}$ is calculated using the above expressions (1) to (12). The other parameters are similar to those in the above first estimation section 42.

The oxygen molar concentration calculation section 47 calculates a necessary intake oxygen molar concentration $O2_{\_new}$ to match the in-fuel-spray air excess ratio $\lambda_{SP\_pmax}$ estimated by the second estimation section 46 with the target in-fuel-spray air excess ratio. For example, such an intake oxygen molar concentration that allows the in-fuel-spray air excess ratio $\lambda_{SP\_pmax}$ to match the target in-fuel-spray air excess ratio $\lambda_{SP}*$ is calculated as the necessary intake oxygen molar concentration $O2_{\_new}$ from aforementioned expression (12) or the like.

The third determining section 48 determines whether or not the necessary intake oxygen molar concentration $O2_{\_new}$ calculated by the oxygen molar concentration calculation section 47 is equal to or less than the concentration upper limit value set based on the oxygen molar concentration in the atmosphere. The concentration upper limit value is, for example, 21%.

The control apparatus 30 controls the fuel injection pressure and the valve opening position of the EGR valve 12 based on the determination result of the above first determining section 42 or the like according to following (A) to (D).

(A) When the first determining section 43 determines that the in-fuel-spray air excess ratio $\lambda_{SP}$ is equal to or higher than the target in-fuel-spray air excess ratio $\lambda_{SP}*$, the control apparatus 30 continues to perform current control without particularly changing the fuel injection pressure and the EGR valve opening position.

(B) When the first determining section 43 determines that an in-fuel-spray air excess ratio $\lambda_{SP}$ is less than a target in-fuel-spray air excess ratio $\lambda_{SP}*$ and the second determining section 45 determines that the necessary fuel injection pressure $P_{inj\_new}$ is equal to or less than the maximum injection pressure, the control apparatus 30 controls the fuel injection by setting the fuel injection pressure to the necessary fuel injection pressure $P_{inj\_new}$. In this case, as for the EGR valve opening position, the control apparatus 30 maintains the current control.

(C) When the first determining section 43 determines that the in-fuel-spray air excess ratio $\lambda_{SP}$ is less than the target in-fuel-spray air excess ratio $\lambda_{SP}*$, the second determining section 45 determines that the necessary fuel injection pressure $P_{inj\_new}$ exceeds the maximum injection pressure, and further the third determining section 48 determines that the necessary intake oxygen molar concentration $O2_{\_new}$ is equal to or less than the oxygen molar concentration in the atmosphere, the control apparatus 30 controls the fuel injection by setting the fuel injection pressure to the necessary fuel injection pressure $P_{inj\_new}$ and controls the valve opening position of the EGR valve 12 so that the intake oxygen molar concentration matches the necessary intake oxygen molar concentration $O2_{\_new}$. At this time, the target valve opening position of the EGR valve 12 is determined from a control map in which the EGR valve opening position is associated with the intake oxygen molar concentration in advance. After this operation, the control apparatus 30 acquires the intake oxygen molar concentration again and checks to see whether or not the intake oxygen molar concentration matches the necessary intake oxygen molar concentration $O2_{\_new}$. When no match is found, the control apparatus 30 temporarily updates the control map in which the EGR valve opening position is associated with the intake oxygen molar concentration according to a predetermined algorithm and re-determines the valve opening position of the target EGR valve 12 using the updated control map. The control map is updated, for example, by changing the EGR valve opening position corresponding to the same intake oxygen molar concentration in a direction in which the EGR valve is closed by a predetermined amount. This operation is repeated until the intake oxygen molar concentration matches the necessary intake oxygen molar concentration $O2_{\_new}$. When the EGR valve opening position is set to one corresponding to the intake oxygen molar concentration obtained from the control map, if the intake oxygen molar concentration has not been successfully set to the necessary intake oxygen molar concentration $O2_{\_new}$ or higher in this way, the valve opening position of the EGR valve 12 is adjusted in a direction in which the valve opening position is closed by a predetermined amount until the intake oxygen molar concentration matches the necessary intake oxygen molar concentration $O2_{\_new}$.

(D) When the first determining section 43 determines that the in-fuel-spray air excess ratio $\lambda_{SP}$ is less than the target in-fuel-spray air excess ratio $\lambda_{SP}*$, the second determining section 45 determines that the necessary fuel injection pressure $P_{inj\_new}$ exceeds the maximum injection pressure and further the third determining section 48 determines that the necessary intake oxygen molar concentration is equal to or less than the oxygen molar concentration in the atmosphere, the control apparatus 30 controls the fuel injection by setting the fuel injection pressure to the necessary fuel injection pressure $P_{inj\_new}$ and the EGR valve 12 is fully closed.

Figure 5:
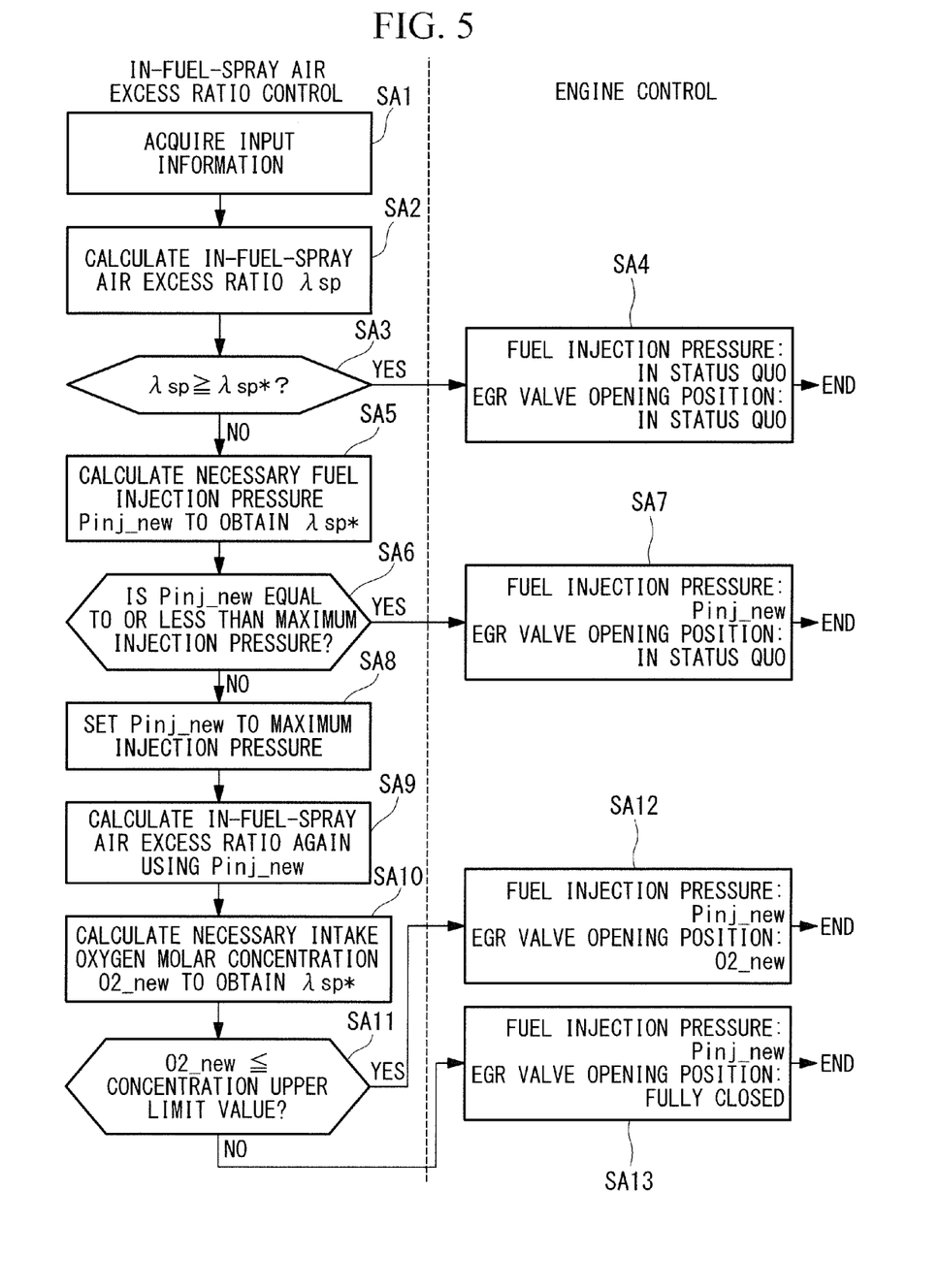
FIG. 5 is a flowchart illustrating a processing procedure of in-fuel-spray air excess ratio control executed by the internal combustion engine control apparatus according to the embodiment of the present invention.

Next, a processing procedure about in-fuel-spray air excess ratio control, executed by the in-fuel-spray air excess ratio control section 40 of the control apparatus 30, will be described with reference to a flowchart shown in FIG. 5.

First, various kinds of input parameters (air intake parameters, fuel parameters or the like) to calculate the in-fuel-spray air excess ratio are acquired (SA1) and the in-fuel-spray air excess ratio $\lambda_{sp}$ is calculated using the various kinds of input parameter (SA2). Next, it is determined whether or not the in-fuel-spray air excess ratio $\lambda_{sp}$ is equal to or higher than the target in-fuel-spray air excess ratio $\lambda_{sp}*$ (SA3), and if the in-fuel-spray air excess ratio $\lambda_{sp}$ is equal to or higher than the target in-fuel-spray air excess ratio ("YES" in SA3), the current control is maintained without particularly changing the fuel injection pressure and the EGR valve opening position (SA4).

On the other hand, if the in-fuel-spray air excess ratio $\lambda_{sp}$ is less than the target in-fuel-spray air excess ratio $\lambda_{SP}*$ ("No" in SA3), such a fuel injection pressure that causes the in-fuel-spray air excess ratio $\lambda_{SP}$ to match the target in-fuel-spray air excess ratio $\lambda_{SP}$ is calculated as the necessary fuel injection pressure $P_{inj\_new}$ (SA5).

Next, it is determined whether or not the necessary fuel injection pressure $P_{inj\_new}$ is equal to or less than the maximum injection pressure (SA6). When the determination result shows that the necessary fuel injection pressure $P_{inj\_new}$ is equal to or less than the maximum injection pressure ("YES" in SA6), the current control of the valve opening position of the EGR valve is maintained and fuel injection is controlled by setting the fuel injection pressure to the necessary fuel injection pressure $P_{inj\_new}$ (SA7).

On the other hand, when the necessary fuel injection pressure $P_{inj\_new}$ exceeds the maximum injection pressure ("NO" in SA6), a maximum injection pressure is set as the fuel injection pressure (SA8), and the in-fuel-spray air excess ratio $\lambda_{SP\_pmax}$ in this case is estimated (SA9).

Next, a necessary intake oxygen molar concentration $O_{2\_new}$ to match the in-fuel-spray air excess ratio $\lambda_{SP\_pmax}$ with the target in-fuel-spray air excess ratio $\lambda_{SP}$ is calculated (SA10) and it is determined whether or not this necessary intake oxygen molar concentration $O_{2\_new}$ is equal to or less than the concentration upper limit value set based on the oxygen molar concentration in the atmosphere (SA11). When this determination result shows that the necessary intake oxygen molar concentration $O_{2\_new}$ is equal to or less than the concentration upper limit value (e.g., 21% which is oxygen molar concentration in the atmosphere) ("YES" in SA11), the fuel injection is controlled by setting the fuel injection pressure to the necessary fuel injection pressure $P_{inj\_new}$ and the valve opening position of the EGR valve 12 is controlled so that the intake oxygen molar concentration matches the necessary intake oxygen molar concentration $O_{2\_new}$, (SA12).

On the other hand, when the necessary intake oxygen molar concentration $O_{2\_new}$ exceeds the concentration upper limit value ("NO" in SA11), the fuel injection is controlled by setting the fuel injection pressure to the necessary fuel injection pressure $P_{inj\_new}$ and the EGR valve is fully closed (SA13).

The control apparatus 30 repeatedly executes SA1 to SA11 (above) at a predetermined time interval and thereby executes fuel injection control and valve opening position control of the EGR valve 12 so that the in-fuel-spray air excess ratio matches or approximates to the target in-fuel-spray air excess ratio $\lambda_{SP}^*$.

As described so far, according to the internal combustion engine control apparatus 30 and the control method thereof according to the present embodiment, the in-fuel-spray air excess ratio is estimated by taking into account the intake oxygen molar concentration, and it is thereby possible to improve the estimation accuracy of the in-fuel-spray air excess ratio.

Furthermore, the fuel injection pressure is controlled so that the estimated in-fuel-spray air excess ratio matches the target in-fuel-spray air excess ratio. Thus, the in-fuel-spray air excess ratio is increased by controlling the fuel injection pressure in particular among the various parameters whose control allows the in-fuel-spray air excess ratio to be increased (e.g., amount of fuel injection, EGR valve opening position). This allows the in-fuel-spray air excess ratio to quickly match or approximate to the target in-fuel-spray air excess ratio while avoiding, for example, a decrease in the torque or an increase in the amount of NOx.

Exclusively when it is not possible to cause the in-fuel-spray air excess ratio to match the target in-fuel-spray air excess ratio by controlling only the fuel injection pressure, the amount of exhaust gas to be circulated is reduced and the in-fuel-spray air excess ratio is increased by adjusting the EGR valve in a direction in which the valve is closed. This makes it possible to cause the in-fuel-spray air excess ratio to match or approximate to the target in-fuel-spray air excess ratio while minimizing the amount of NOx generated.

According to the present embodiment, the oxygen molar concentration is measured using the aforementioned intake manifold oxygen molar concentration sensor 20, but instead of this, the oxygen molar concentration can also be estimated using the amount of EGR gas and the air excess ratio. Hereinafter, the method of estimating an oxygen molar concentration will be described.

For example, an intake oxygen molar concentration {%} is expressed by following expression (15).

$$O_2 = O_{2\_air} \cdot \left(1 - \frac{R}{\lambda}\right) \quad (15)$$

Here, $O_2$ is intake oxygen molar concentration {%}, $O_{2\_air}$ is oxygen molar concentration {%} in the air, R is an EGR rate {-} and λ is air excess ratio {-}. Here, the EGR gas rate is a value obtained by dividing the amount of EGR gas calculated from a difference between the total amount of gas taken into the cylinder and the amount of air by the total amount of gas taken into the cylinder.

As the above amount of air, the amount of air before compression is used. For example, it is possible to provide an air flow meter upstream of a compressor in the air flow and use this measured value.

The amount of gas taken into the cylinder is calculated from a function of a pressure and a gas temperature at the intake manifold based on an equation of state of the gas and the energy conservation law. Furthermore, the air excess ratio can be calculated from a pressure and gas temperature at the intake manifold and a measured value of the air flow meter provided upstream of the compressor in the air flow.

That is, by setting a pressure sensor and a temperature sensor at the intake manifold and setting an air flow meter, it is possible to estimate the intake oxygen molar concentration from these measured values.

The invention claimed is:

1. An internal combustion engine control apparatus to be applied to an internal combustion engine including an exhaust gas recirculation scheme in which part of an exhaust gas of the engine is to be circulated into an air intake system, the apparatus comprising:
    a parameter acquiring section to acquire an air intake parameter to intake air including an intake oxygen molar concentration and a fuel parameter to relate to fuel injection;
    a first estimating section to estimate an in-fuel-spray air excess ratio to comprise an air excess ratio within a fuel spray to be substantially in accordance with the air intake parameter and the fuel parameter;
    a first determining section to determine whether or not the in-fuel-spray air excess ratio is equal to or higher than a preset predetermined target in-fuel-spray air excess ratio;
    a pressure calculating section to calculate, if the in-fuel-spray air excess ratio is determined to be less than the target in-fuel-spray air excess ratio, a necessary fuel injection pressure to match the in-fuel-spray air excess ratio with the target in-fuel-spray air excess ratio; and
    a second determining section to determine whether or not the necessary fuel injection pressure is equal to or less than a preset maximum injection pressure,
    a second estimating section to estimate, if the second determining section determines that the necessary fuel injection pressure exceeds the maximum injection pressure, an in-fuel-spray air excess ratio if the maximum injection pressure is set as the fuel injection pressure; and an oxygen molar concentration calculating section to calculate a necessary intake oxygen molar concentration to match the in-fuel-spray air excess ratio to be estimated by the second estimating section with the target in-fuel-spray air excess ratio, wherein if the necessary fuel injection pressure is determined to be equal to or less than the maximum injection pressure, fuel injection is to be performed at the necessary fuel injection pressure, wherein if the necessary fuel injection pressure is determined to exceed the maximum injection pressure, fuel injection is to be performed at the maximum injection pressure and the amount of exhaust gas to be circulated into the air intake system is to be controlled based on the necessary intake oxygen molar concentration.

2. The internal combustion engine control apparatus according to claim 1, wherein if the necessary intake oxygen molar concentration exceeds an upper limit value of concentration set in advance based on an atmospheric oxygen molar concentration, the amount of exhaust gas to be circulated into the air intake system is to be set to 0.

3. An internal combustion engine control method applied to an internal combustion engine adopting an exhaust gas recirculation scheme in which part of an exhaust gas of the engine is circulated into an air intake system, the method comprising:

acquiring an air intake parameter relating to intake air including an intake oxygen molar concentration and a fuel parameter relating to fuel injection;

a first estimating an in-fuel-spray air excess ratio which is an air excess ratio within a fuel spray using the air intake parameter and the fuel parameter;

a first determining whether or not the in-fuel-spray air excess ratio is equal to or higher than a preset predetermined target in-fuel-spray air excess ratio;

calculating, if the in-fuel-spray air excess ratio is determined to be less than the target in-fuel-spray air excess ratio, a necessary fuel injection pressure to match the in-fuel-spray air excess ratio with the target in-fuel-spray air excess ratio; and a second determining whether or not the necessary fuel injection pressure is equal to or less than a preset maximum injection pressure, estimating, if the necessary fuel injection pressure is determined to exceed the maximum injection pressure by the second determining, an in-fuel-spray air excess ratio if the maximum injection pressure is set as the fuel injection pressure; and calculating a necessary intake oxygen molar concentration to match the in-fuel-spray air excess ratio estimated by the second estimating with the target in-fuel-spray air excess ratio, wherein if the necessary fuel injection pressure is determined to be equal to or less than the maximum injection pressure, fuel injection is performed at the necessary fuel injection pressure, wherein if the necessary fuel injection pressure is determined to exceed the maximum injection pressure, fuel injection is performed at the maximum injection pressure and the amount of exhaust gas to be circulated into the air intake system is controlled based on the necessary intake oxygen molar concentration.

* * * * *